Aug. 12, 1952     I. Z. SMOKER     2,606,648
LOADING AND UNLOADING APPARATUS Filed Oct. 15, 1946     6 Sheets-Sheet 1

INVENTOR.
Isaac Z. Smoker,
BY John B. Brady
ATTORNEY

Aug. 12, 1952     I. Z. SMOKER     2,606,648
LOADING AND UNLOADING APPARATUS

Filed Oct. 15, 1946     6 Sheets-Sheet 3

INVENTOR.
Isaac Z. Smoker,
BY
John Q. Brady
ATTORNEY

Patented Aug. 12, 1952

2,606,648

UNITED STATES PATENT OFFICE 2,606,648

LOADING AND UNLOADING APPARATUS

Isaac Z. Smoker, Intercourse, Pa.

Application October 15, 1946, Serial No. 703,447

4 Claims. (Cl. 198—233)

My invention relates broadly to a loading and unloading apparatus and more particularly to an improved construction of elevator and unloader which is readily transportable to the location of the loading or unloading operation.

One of the objects of my invention is to provide an improved construction of portable elevator or unloader for handling ear corn, sacks, bales, grain and other heavy material.

Another object of my invention is to provide a construction of load handling apparatus having an adjustable frame for modifying the height of the apparatus to enable the equipment to be passed through building or barn doors, beneath underpasses, cable lines and other overhead obstructions, etc.

Another object of my invention is to provide a construction of load receiving hopper for loading and unloading action and coaction with an endless chain conveyor.

Still another object of my invention is to provide a construction of raising and lowering mechanism for an endless chain conveyor for angularly moving the conveyor about a center adjacent the base of the frame of the machine for predetermining the altitude of the upper end of the conveyor.

Still another object of my invention is to provide an arrangement of guide means for the upper end of the conveyor system of a loading and unloading apparatus together with a chute mechanism adapted to receive and direct material to desired locations.

Other and further objects of my invention relate to an improved construction of elevating conveyor and accessory mechanism at opposite ends thereof for facilitating loading and unloading operations as set forth more fully in the specification hereinafter following by reference to the accompanying drawings in which:

Fig. 13 is a fragmentary plan view of the upper end of the conveyor mechanism.

Referring to the drawings in detail reference character 1 designates the chassis of the loading and unloading apparatus forming an axle housing within which an axle is journaled which carries wheels, represented by reference character 2. The chassis 1 has a central beam 3 extending therefrom which is of hollow tubular structure to allow the adjustable entry of the longitudinally extending beam 4 in a telescopic arrangement. The chassis for the left-hand end of the machine is constituted by the frame structure 5 having a pair of depending supporting feet 6 at opposite sides thereof. The chassis 5 carries the beam 4 which telescopically slides into and out of the longitudinally extending hollow beam 3 associated with the chassis 1, thereby facilitating assembly of the mechanism and adjustment thereof.

Figures 3, 21:
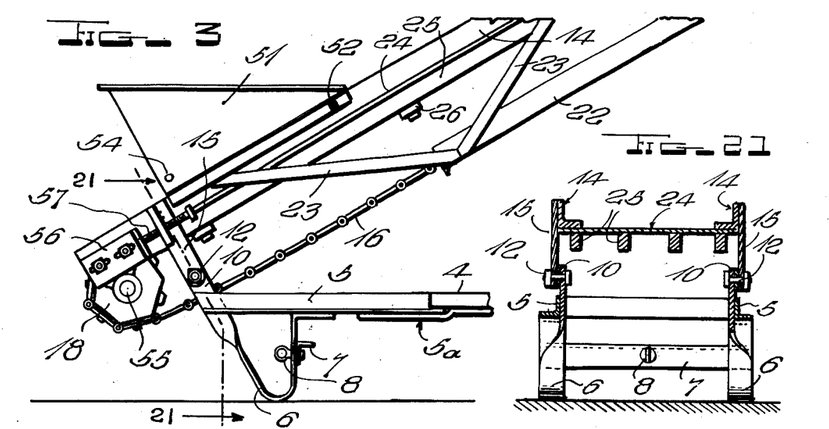
Fig. 3 is a fragmentary side elevational view of the lower end of the frame of the conveyor mechanism on an enlarged scale.
Fig. 21 is a vertical sectional view taken substantially on line 21—21 of Fig. 3 and illustrates the journaling means between the lower end of the conveyor frame and the chassis of the apparatus.
Figure 4:
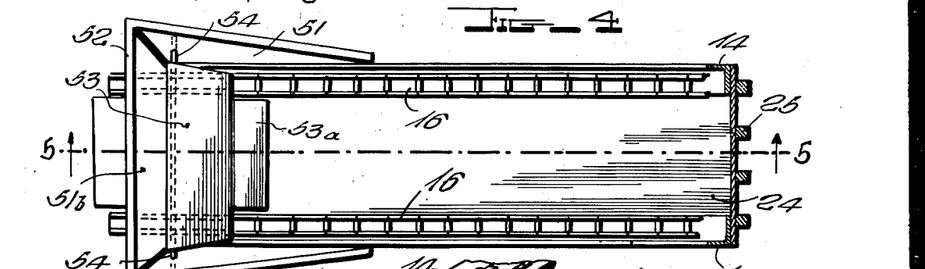
Fig. 4 is a top plan view of the lower end of the conveyor mechanism illustrated in Fig. 3.
Figure 5:
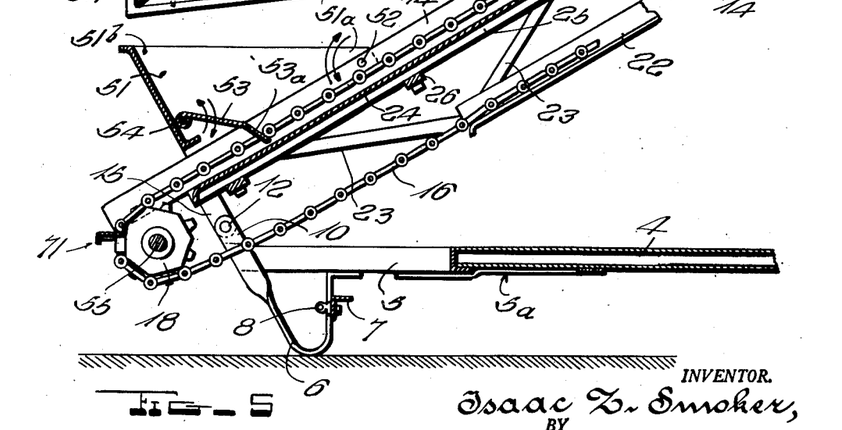
Fig. 5 is a fragmentary longitudinal sectional view taken on line 5—5 of Fig. 4.
Figure 6:
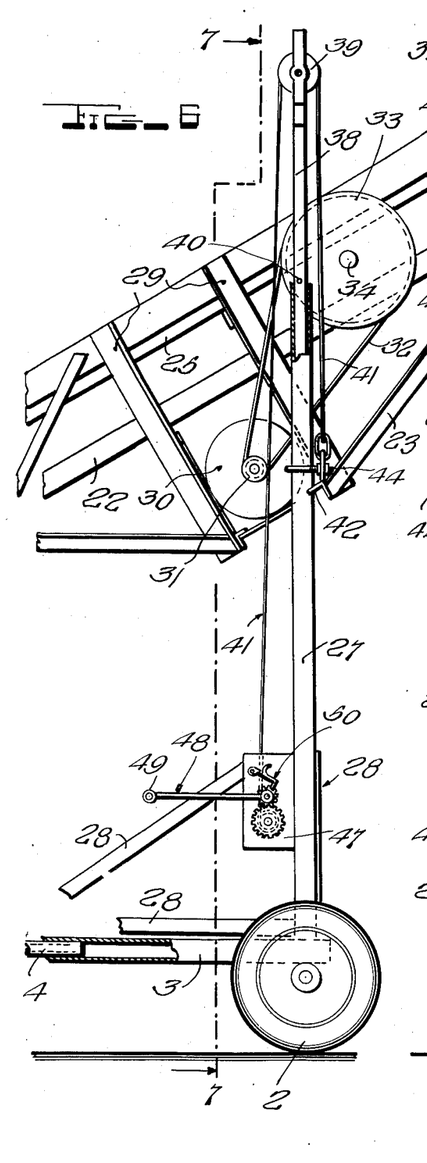
Fig. 6 is a fragmentary side elevational view on an enlarged scale taken substantially through the middle of the loading and unloading apparatus and illustrating the telescopic mechanism employed for raising and lowering the elevator with respect to the frame.
Figure 7:
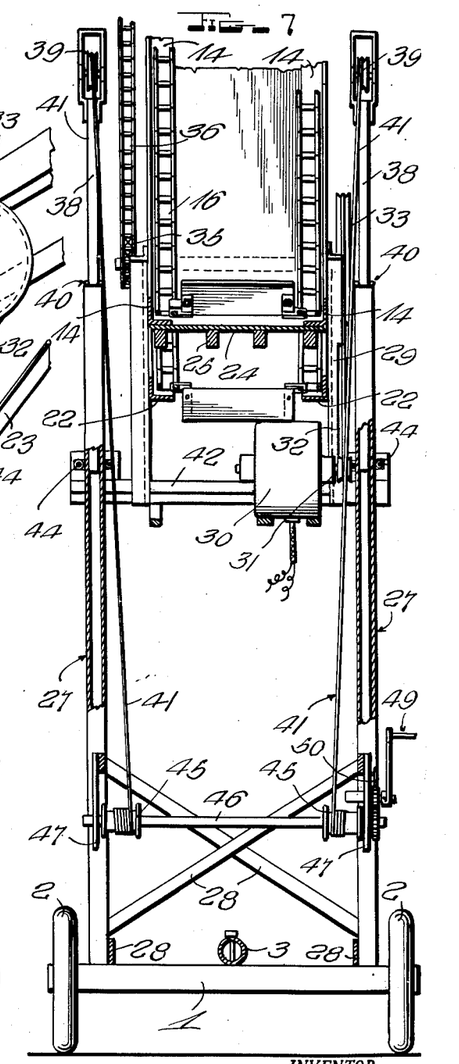
Fig. 7 is a vertical sectional view taken substantially on line 7—7 of Fig. 6.

The chassis 5 at the left-hand end of the machine includes a transversely extending beam 7 secured to the spaced feet 6. The beam 7 provides a central connecting means 8 serving as a draw bar connection whereby a tractor may be readily connected through member 9 to the loading and unloading mechanism for moving the machine to the desired location for performing a loading or unloading operation. The chassis 5 and central longitudinally extending beam are reinforced by suitable angularly disposed frame members represented at 5a for insuring adequate strength to the supporting chassis. The feet 6 of the chassis 5 extend upwardly as represented more clearly in Figs. 3, 5 and 21 to the positions 10 where they serve as journaling means in association with pivot members 12, for the angularly movable frame 14 which supports the endless conveyor. The angularly movable frame 14 has depending members 15 thereon which serve as interconnecting members for the journaling means 12, thus allowing the frame 14 of the conveyor mechanism to be angularly moved about the chassis 5 as a center in adjusting the position of the endless conveyor.

The endless conveyor is represented at 16 as comprising sprocket chains which are guided along the angle members constituting the frame 14 and are driven by sprocket wheels 17 adjacent the top of the elevator and operate over sprocket wheels 18 adjacent the bottom of the elevator. The sprocket wheels 17 adjacent the top of the elevator are carried by shaft 19 which is journaled by suitable means such as brackets 20, which depend from members 21 secured to frame 14 of the elevator. The sprocket chains 16 pass over and under the frame 14 with the lower portions of the sprocket chains 16 constituting the return portion of the sprocket chains supported by angle members 22 suitably supported in spaced relation to the frame 14 by side supports extending from frame 14 and represented generally at 23. The load carried by the sprocket chain 16 is further supported by the center platform which extends between the angle members constituting frame 14 and shown at 24. The platform 24 serves as additional support between the sides of the frame 14 for the load carried by the endless conveyor. To insure proper reinforcement for the platform 24, I provide longitudinally extending beams 25 which are supported with respect to frame 14 at transversely spaced positions by means of transverse beams 26.

Referring to the middle portion of the structure of the machine, it will be observed that the chassis 1 has erected thereon the vertically extending hollow tubular supports 27. These supports are suitably reinforced with respect to chassis 1 to insure rigidity by angularly disposed reinforcing members which I have represented at 28 as connected with the hollow tubular longitudinally extending beam 3 of the apparatus. These vertically projecting hollow tubular members 27 are so spaced that the frame 14 of the endless conveyor may be raised or lowered between the spaced vertically extending members 27. The frame 14 is provided with extension frame members 29 projecting substantially normal to the plane of the frame 14 and serving as a bed support for the motor drive mechanism which I have indicated generally at 30.

In this particular construction the motor is represented as an electric motor intended for use in installations where electric power is readily obtainable, through a flexible cable connection where loading or unloading operations are to be performed adjacent a barn or building or at a railway siding. Where, however, the machine is to be used in the field, the source of motive power may be a gasoline engine. In such cases, the engine may be supported with respect to the angularly shiftable frame 14, as I have described herein, or the engine may be mounted in fixed relation to the chassis 1 and a belt or shaft driven connection made to the shaft which drives the sprocket chains.

In the arrangement shown, the electric motor 30 drives member 31, which is belt connected, as represented at 32 with member 33 carried by shaft 34. Shaft 34 is journaled from frame 14 and carries sprocket wheel 35. Sprocket wheel 35 is connected through sprocket chain 36 which engages sprocket wheel 37 on shaft 19. As heretofore explained, shaft 19 carries sprocket wheels 17 which engage the sprocket chains 16 for driving the conveyor.

Thus, in the arrangement illustrated, the motive power for the endless conveyor is carried by the frame structure 14 so that the frame structure 14 may be shifted to any angular position while the motive power is continuously supplied thereto for driving the endless conveyor.

Figure 1:
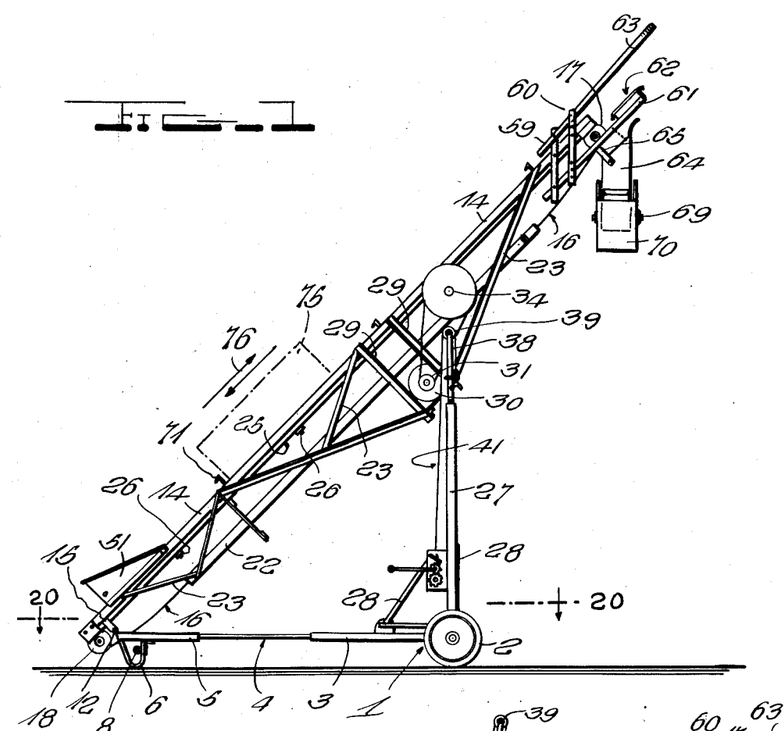
Figure 1 is a side elevational view of the loading and unloading apparatus of my invention showing the frame of the equipment in an extended position with the elevating conveyor in its maximum extended position.
Figures 12, 14, 15, 16, 18, 19:
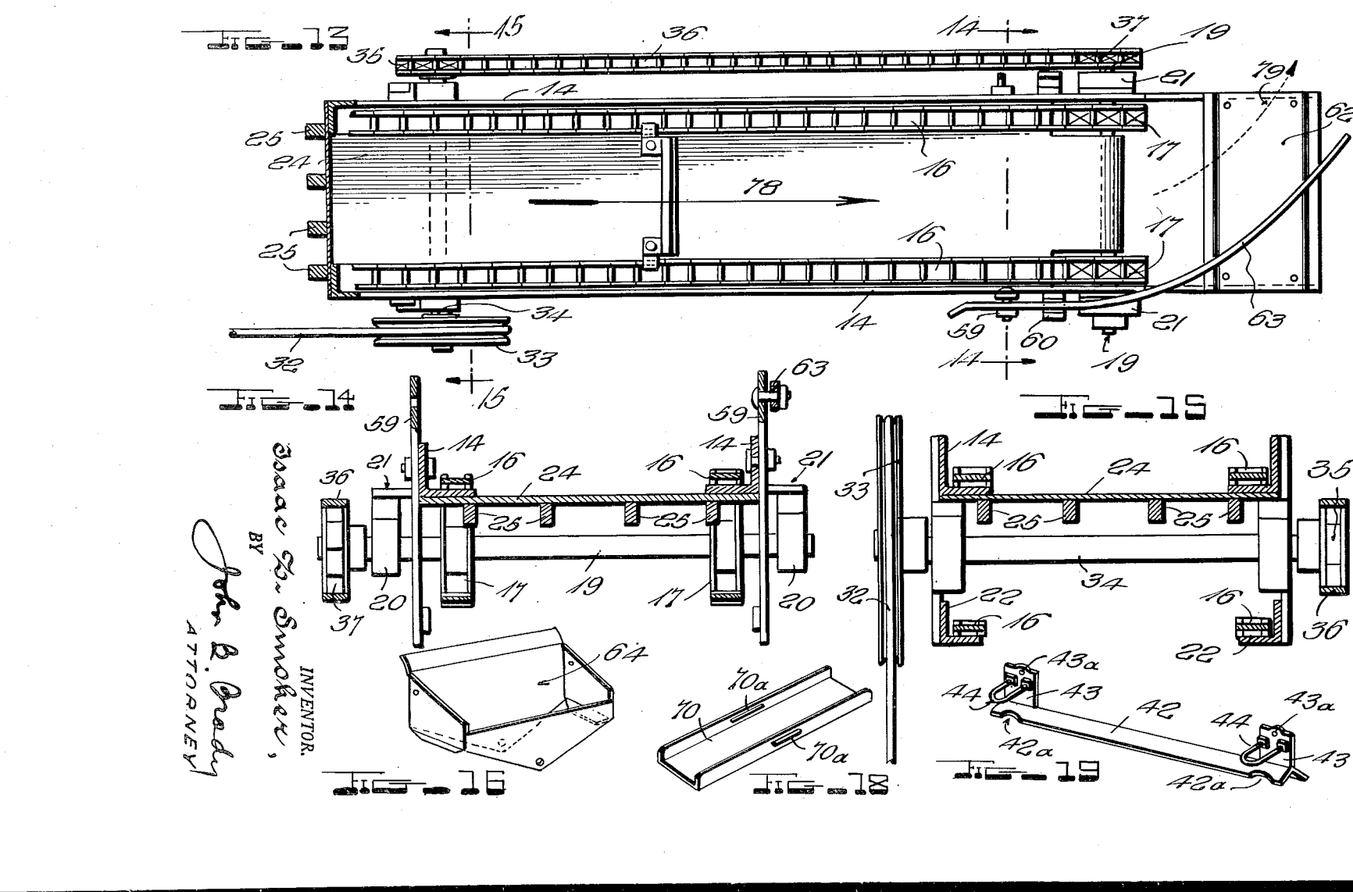
Fig. 14 is a fragmentary vertical sectional view taken substantially on line 14—14 of Fig. 13.
Fig. 15 is a vertical sectional view taken substantially on line 15—15 of Fig. 13.
Fig. 16 is a perspective view of one portion of the chute which is suspended from the upper end of the conveyor frame.
Fig. 18 is a perspective view of another portion of the chute mechanism illustrated in Fig. 16.
Fig. 19 is a perspective view of one of the transverse adjustable beams which support the conveyor frame.
Figures 17, 20, 22, 23, 24, 25:
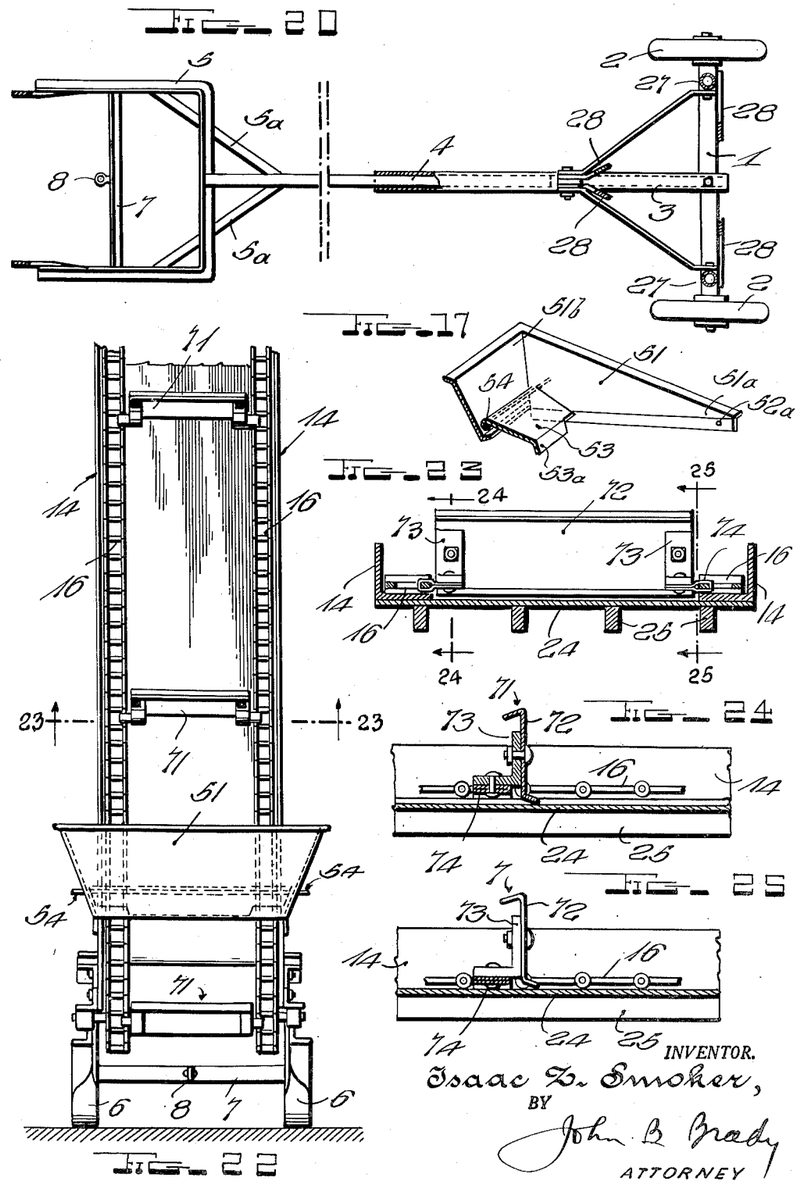
Fig. 17 is a fragmentary perspective view of a portion of the hopper carried by the lower end of the conveyor frame.
Fig. 20 is a horizontal sectional view taken substantially on line 20—20 of Fig. 1.
Fig. 22 is an end elevational view of a fragmentary portion of the loading and unloading apparatus.
Fig. 23 is a horizontal sectional view taken substantially on line 23—23 of Fig. 22 looking upwardly.
Fig. 24 is a fragmentary sectional view taken substantially on line 24—24 of Fig. 23
Fig. 25 is a fragmentary sectional view taken substantially on line 25—25 of Fig. 23.

The mechanism which permits the raising and lowering of the frame 14 and the endless conveyor and motive power means associated therewith, comprises the vertical supports 38, which enter the hollow tubular supports 27 and carry at the extremities thereof the guide wheels 39. The supports 38 are suitably fixed in the hollow tubular members 27 by means of diametrically extending pins 40 in such position as will determine the maximum height to which the elevator is to be angularly adjusted, as represented in Fig. 1. The maximum altitude required for any particular work is readily determined and the position of members 38 adjusted within the hollow tubular supports 27 to meet the required conditions. Cables 41 extend over the guide wheels 39 and fasten at one end to opposite ends of the transverse beam 42, shown more clearly in Fig. 19. The transverse beam 42 comprises an angle member having vertically extending plates 43 projecting upwardly therefrom and carrying strap members 44 thereon. Strap members 44 encircle the vertically extending hollow tubular supports 27 and are guided thereby. The transverse member 42 is cut away, as represented at 42a, to engage the sides of the vertically extending tubular members 27 and to be guided thereby. The plate members 43 are apertured at 43a to permit the connection of the flexible cables 41 thereto, as heretofore explained. The transverse beam 42 is suitably connected with the elevator frame 14 through the depending frame members 29 so that the frame 14 may be raised and lowered as cables 41 are operated over guide wheels 39.

The other ends of cables 41 are secured around drums 45, which are carried by shaft 46, which is journaled in fixed position with respect to chassis 1, through depending members 47. One of the depending members 47 serves as a journaling means for a coacting crank arm 48 having a control handle 49 thereon for operating a geared drive which rotates shaft 46 for taking up or letting out the required amount of cable 41 for angularly raising or lowering the frame 14. A suitable detent 50 is associated with the crank mechanism 48 to maintain the crank in a set position and thereby maintain the elevator in a predetermined angular position with respect to the chassis of the apparatus. Thus it will be seen that the elevator frame 14 may be angularly raised or lowered about the fulcrum 12 adjacent the left-hand end of the apparatus as viewed in Fig. 1 to position the elevator in the desired angular position. During such adjustment the elevator frame 14 moves between the vertically extending members 38 and 27 according to the adjustment imparted thereto by the cable system 41. While I have illustrated the adjustment means as operated by a hand crank system, I desire that it be understood that means may be employed for operating the angular positioning mechanism from the driving means which operates the endless chain conveyor. Suitable clutch mechanism may be employed for applying the motive power from the drive power source which drives the conveyor to effect the raising of the conveyor to the desired angular position.

In Figs. 1–5 and Figs. 17 and 22 I have shown more clearly the construction of hopper which is arranged to receive material to be loaded or unloaded. The hopper is designated by reference character 51 as having side portions adapted to overlap the exterior of frame 14 and to be pivotally mounted with respect thereto, as represented at 52 by bolt members passed through apertures 52a in the side walls of hopper 51. The hopper 51 tapers from a minimum height at one end, 51a, to a maximum height at its opposite end at 51b and interiorly of the hopper adjacent the end 51b thereof I provide a bottom member 53 which is pivotally mounted in the side walls of the hopper on transverse bar 54 and has a depending central portion 53a which extends downwardly between the sprocket chains 16 to a position adjacent the platform 24 which extends between the sprocket chains. The hopper facilitates the loading or unloading operation providing support for ear corn, sacks, grain as well as bales of hay. The entire hopper 51 may be moved out of position by swinging the hopper 51 about the journals 52 and allowing the loading or unloading material to pass through the hood thus formed by the hopper if the support provided by the hopper is not desired.

Proper tensioning of the conveyor is maintained by arranging shaft 55 which carries the sprocket wheels 18 adjacent the lower end of the elevator 16, on adjustable brackets represented at 56. These adjustable brackets 56 are arranged to be adjusted longitudinally by the frame 14 by means of adjustable screws 57 symmetrically arranged at each side of the frame 14.

As heretofore explained, the load on the sprocket chains 16 is supported both by the inwardly extending angle members constituting the frame 14 and also the auxiliary angle members 22 which are secured in spaced relation below the frame 14 by members 23, as shown particularly in Fig. 12. In order to guide the underside of the sprocket chains 16 with respect to the angle members 22, I provide on the supporting members 23 the roller members 58 which project inwardly to a sufficient extent to insure the centering of the underside of sprocket chains 16 between rollers 58 and the auxiliary angle members 22.

At the upper end of the elevator I provide an adjustable guide means for directing bales. The guide means is illustrated more particularly in Figs. 1, 2, 8, 9 and 11 as comprising a pair of bars 59 and 60, which are secured in spaced positions on frame 14 and extend above and below the frame. Immediately below the frame 14 the bars 59 and 60 serve as supports for the members 61 which project beyond the end of frame 14 and serve as supports for the platform 62. The platform 62 is thus positioned slightly below the plane of the upper end of the conveyor. The position of the platform 62 is adjustable by reason of the adjustment apertures 60a which are provided at spaced intervals at bar 60 and allow the members 61 to be suitably angularly shifted about the centers 59a in bars 59 to accurately fix the angular position of platform 62 with respect to the end of the conveyor. The upper ends of bars 59 and 60 serve as supports for the guide member 63. The guide member 63 is curved, as shown for directing a bale. The guide member 63 is pivotally mounted at 59b in bar 59 and is adapted to be centered in yoke 60b in the upper end of bar 60. Bars 59 and 60 are symmetrically arranged at each side of the frame 14 so that guide 63 can be readily interchanged from one side to the other, depending upon the direction in which the bale is to be guided.

The bars 59 and 60 also serve as supporting means for the adjustable chute illustrated in Figs. 1, 2, 8, 10, 16 and 18. The adjustable chute comprises the suspended frame 64 which is connected through member 65 with member 61. The connection between the member 65 and suspended frame 64 is a pivotal connection represented at 66, adjacent one side of the frame 64, the other side of which is supported with relation to member 61 through flexible chains 67 fastened to pins 68 carried by member 61. This permits the suspension of frame 64 in proper relation to the end of the conveyor for insuring the discharge of corn or grain or other material in the proper direction through frame 64.

Figures 8, 9, 10, 11, 12:
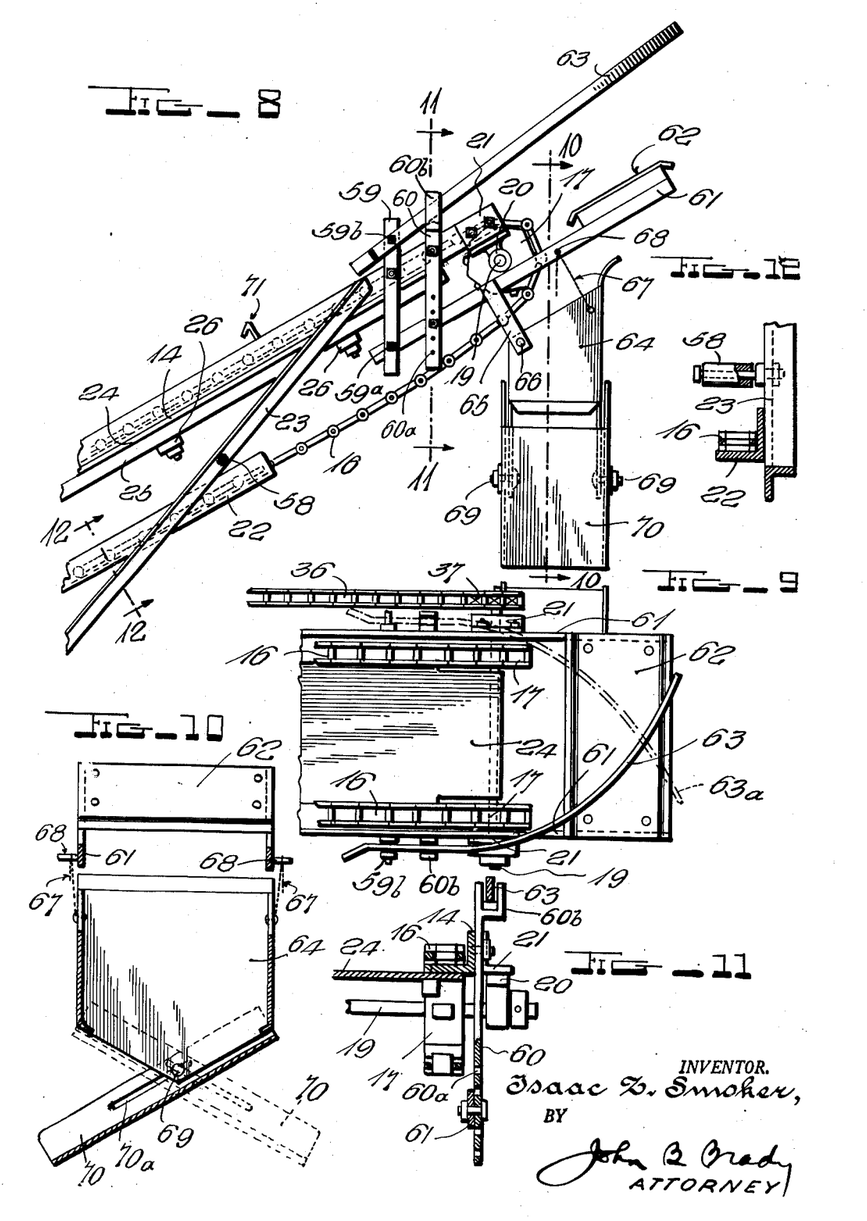
Fig. 8 is a side elevational view of the upper right-hand end of the loading and unloading apparatus and showing particularly the adjustable guide means for handling bales and the adjustable chute for handling ear corn, grain, sacks and other kinds of loads.
Fig. 9 is a fragmentary plan view of the upper end of the conveyor mechanism illustrated in Fig. 8.
Fig. 10 is a vertical sectional view through the adjustable chute and upper end of the guide means associated with the conveyor frame taken substantially on line 10—10 of Fig. 8.
Fig. 11 is a fragmentary vertical sectional view taken substantially on line 11—11 of Fig. 8.
Fig. 12 is a fragmentary sectional view taken substantially on line 12—12 of Fig. 8 and showing the detail of the support for the endless conveyor.

Frame 64 is shaped at its discharge end as represented in more detail in Fig. 10 in which the depending side walls of frame 64 are tapered to provide a pivotal support at 69 for the chute 70. The chute 70 is provided with slots 70a in opposite sides thereof which are engaged by the pivot members 69 and enable the chute to be angularly shifted in that direction in which the corn, grain or other material is to be discharged. By moving the chute 70 with the slots 70a therein variably engaging the pivot means 69, a position may be selected at which the discharge of corn, grain, etc. may be carried out more efficiently.

The sprocket chains 16 support transverse members represented at 71 at spaced intervals along the length thereof to facilitate the loading or unloading operation. The transverse members constitute shelflike extensions 72 which are carried by transverse bracket members 73 which fasten to strap members 74. The strap members 74 engage one side of the open links of the chains 16 at spaced intervals along the length thereof. Thus the transverse shelflike members 71 facilitate the raising of sacks, bales, ears of corn, etc. when the apparatus is employed as an unloader. The pivotally mounted bottom section 53 with extension 53a in hopper 51 is readily swingable to a position which enables the shelflike members 71 to pass without obstruction when the apparatus is used as an elevator. When the apparatus is used as an unloader the bottom 53 is swung to a position in which it will not constitute an obstruction to the movement of the shelflike members 71.

One of the important features of my invention is the ability of the parts of the chassis to expand and contract with respect to each other by virture of the telescopic connection between beam 4 extending from chassis section 5 and the hollow beam 3 extending from chassis section 1. When the elevator is moved to its lowest position the feet 6 on the left-hand end of the frame structure are spaced the maximum distance from the wheels 2 on the right-hand end of the frame structure. When, however, the elevator is moved to the highest elevating position the feet 6 of the left-hand end of the frame structure are adjusted to the minimum spacial relation to the wheels 2 on the right-hand end of the chassis. However, I select the minimum distance as represented in Fig. 1 as sufficient to maintain stable equilibrium of the frame structure in proportion to the load to be handled by the equipment.

Figure 2:
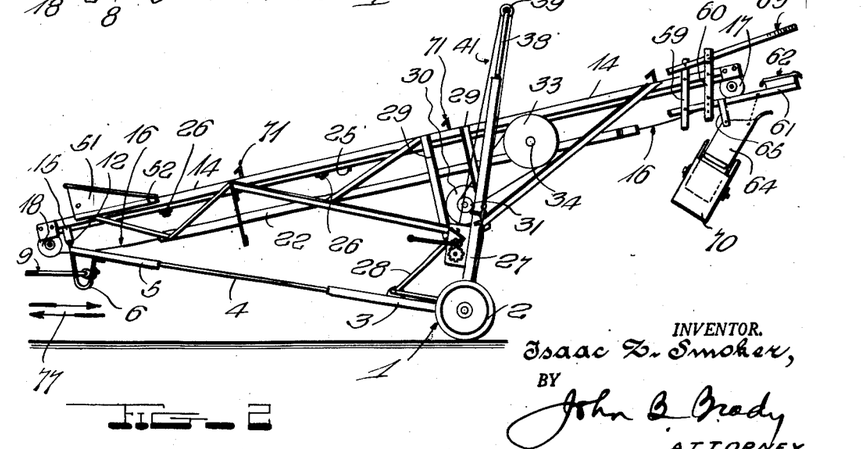
Fig. 2 illustrates the loading and unloading apparatus in collapsed position with the endless conveyor lowered and the machine in position for transportation to or from the location of the loading or unloading operation.

I have represented the equipment in Fig. 1 as operating upon bales, indicated generally by dotted lines 75, capable of being moved either upwardly or downwardly as indicated by arrows 76. In Fig. 2 I indicated by arrows 77 that the entire apparatus may be pulled or pushed in transporting the apparatus to the loading or unloading position. In Fig. 13 I have shown by arrows 78 and 79 the direction of movement of bales when the apparatus is used for elevating bales. The dotted line position 63a of the bale guide illustrated in Fig. 9 represents the position to which the bale guide 63 is shifted when the bales are to be discharged in a direction opposite to the direction illustrated by arrow 79 in Fig. 13.

By reason of the construction of the elevator of my invention it is possible to run the elevator directly adjacent a stack of bales with a vehicle directly adjacent the elevator and effect a loading or unloading operation. Heretofore considerable space has been required in effecting a loading or unloading operation as the inclined plane of an endless conveyor has been utilized in a position substantially normal to the stack of bales and to the vehicle. Substantial economies in operating time have been secured by the use of the equipment of my invention.

While I have described the structure of my invention in one of its preferred embodiments I desire that it be understood that modifications may be made, and I intend no limitations upon my invention other than may be imposed by the scope of the appended claims.

What I claim as new and desire to secure by Letters Patent of the United States is as follows:

1. In an apparatus of the class described, a wheeled chassis having a substantially vertically disposed telescopic extendible and contractible structure, a substantially horizontally extending telescopic frame connected with said chassis and having a support on the remote end thereof, an angularly adjustable conveyor frame, means for pivotally mounting the lower end of said conveyor frame on said horizontally extending frame adjacent said support, means connected with the upper portions of said vertically disposed telescopic extendible and contractible structure and connected with said conveyor frame for angularly raising and lowering said conveyor frame about said pivotal mounting means, an endless conveyor journaled at its lower end on said conveyor frame adjacent said support and journaled at its upper end in the opposite end of said conveyor frame, said conveyor frame being movable at its upper end between said vertically disposed telescopic extendible and contractible structure, sets of frame members inclined downwardly from positions adjacent the opposite ends of said conveyor frame toward each other, extension frame members connected with said conveyor frame at one end and with said frame members at the opposite ends, a source of motive power supported between the adjoining ends of said frame members and said extension frame members, and means for driving said endless conveyor from said source of motive power.

2. In an apparatus of the class described, a wheeled chassis having a substantially vertically disposed telescopic extendible and contractible structure, a substantially horizontally extending telescopic frame connected with said chassis and having a support on the remote end thereof, an angularly adjustable conveyor frame, means for pivotally mounting the lower end of said conveyor frame on said horizontally extending frame adjacent said support, an endless conveyor journaled at its lower end on said conveyor frame adjacent said support and journaled at its upper end in the opposite end of said conveyor frame, said conveyor frame being movable at its upper end between said vertically disposed telescopic extendible and contractible structure, guide wheels carried by the upper ends of said vertically disposed telescopic extendible and contractible structure, cables connected with the upper end of said endless conveyor frame and passing over the guide wheels on the upper ends of said vertically disposed telescopic extendible and contractible structure, and cable drums mounted adjacent the lower ends of said vertically disposed telescopic extendible and contractible structure for winding said cables on and off of said drums for elevating and lowering said endless conveyor frame, sets of frame members inclined downwardly from positions adjacent the opposite ends of said conveyor frame toward each other, extension frame members connected with said conveyor frame at one end, and with said frame members at the opposite ends, a source of motive power supported between the adjoining ends of said frame member and said extension frame members, and means for driving said endless conveyor from said source of motive power.

3. In an apparatus of the class described, a wheeled chassis having substantially vertical and horizontal telescopic frame structures extending therefrom, a ground engaging support adjustably connected with the horizontal telescopic frame structure, a frame for an endless conveyor pivotally mounted at its lower end on said horizontal frame structure adjacent said ground engaging support, means for angularly shifting the upper end of said frame between said vertical telescopic frame structure, an endless conveyor journaled at opposite ends in said frame, angularly inclined frame members projecting downwardly from said frame from positions adjacent opposite ends thereof to a position spaced from the under side of said frame, sets of extension frame members extending substantially normal from said frame and connected with the depending ends of said angularly inclined frame members, a source of motive power supported between the adjoining ends of said angularly inclined frame members and said extension frame members, and means for continuously driving said endless conveyor from said source of motive power.

4. In an apparatus of the class described, a two wheeled chassis having substantially vertical and horizontal telescopic frame structures extending therefrom, a ground engaging support adjustably connected with the horizontal telescopic frame structure, a frame for an endless conveyor pivotally mounted at its lower end on said horizontal frame structure adjacent said ground engaging support, means for angularly shifting the upper end of said frame with respect to said vertical telescopic frame structure, means for adjusting the position of said ground engaging support with respect to said vertical telescopic frame structure, an endless conveyor journaled at opposite ends in said frame, angularly inclined frame members projecting downwardly from said frame from positions adjacent opposite ends thereof to a position spaced from the under side of said frame, sets of extension frame members extending substantially normal from said frame and connected with the inclined ends of said angularly inclined frame members, frame members extending substantially parallel to the plane of said frame and interconnecting said angularly inclined frame members and said extension frame members, a source of motive power supported on said substantially parallelly extending frame members, and driving means connected with said source of motive power and extending in an upwardly inclined direction toward the upper end of said frame and connected with said endless conveyor for continuously driving said endless conveyor.

ISAAC Z. SMOKER.

REFERENCES CITED

The following references are of record in the file of this patent:

UNITED STATES PATENTS

| Number | Name | Date |
|---|---|---|
| 823,436 | Oyer | June 12, 1906 |
| 923,064 | Morenus | May 25, 1909 |
| 1,639,346 | Liggett | Aug. 16, 1927 |
| 1,752,612 | Owens et al. | Apr. 1, 1930 |
| 1,784,872 | Hartman | Dec. 16, 1930 |
| 2,022,146 | Ossing | Nov. 26, 1935 |
| 2,033,234 | Estes | Mar. 10, 1936 |
| 2,354,990 | Gilbert et al. | Aug. 1, 1944 |
| 2,403,636 | Chantland | July 9, 1946 |